United States Patent
Wu et al.

(10) Patent No.: US 9,464,168 B2
(45) Date of Patent: Oct. 11, 2016

(54) METHOD FOR PREPARING A MODIFIED COPOLYESTER

(71) Applicant: FAR EASTERN NEW CENTURY CORPORATION, Taipei (TW)

(72) Inventors: Roy Wu, Taipei (TW); Pang-Chin Liu, Taoyuan (TW); Yi-Hsuan Tang, Taipei (TW)

(73) Assignee: Far Eastern New Century Corporation, Taipei (TW)

( * ) Notice: Subject to any disclaimer, the term of this patent is extended or adjusted under 35 U.S.C. 154(b) by 0 days.

(21) Appl. No.: 14/832,045

(22) Filed: Aug. 21, 2015

(65) Prior Publication Data

US 2016/0185900 A1  Jun. 30, 2016

(30) Foreign Application Priority Data

Dec. 31, 2014 (TW) .............................. 103146571 A

(51) Int. Cl.
*C08G 63/02* (2006.01)
*C08G 63/86* (2006.01)

(52) U.S. Cl.
CPC .................................. *C08G 63/866* (2013.01)

(58) Field of Classification Search
CPC ............................. C08G 63/78; C08G 63/183
USPC ......................................... 528/271, 272, 274
See application file for complete search history.

(56) References Cited

U.S. PATENT DOCUMENTS

| 2005/0027098 A1* | 2/2005 | Hayes ................ C08G 63/6886 528/272 |
| 2006/0009609 A1* | 1/2006 | Hayes .................... B32B 27/06 528/272 |
| 2014/0024795 A1* | 1/2014 | Allen ..................... C08G 18/44 528/29 |

* cited by examiner

*Primary Examiner* — Terressa Boykin
(74) *Attorney, Agent, or Firm* — The Mueller Law Office, P.C.

(57) ABSTRACT

A method for preparing a modified copolyester includes the steps of: i) subjecting a mono(2-hydroxylalkyl)dicarboxylate to an esterification reaction with an isosorbide to form an intermediate; and ii) subjecting the intermediate to a condensation polymerization in the presence of a condensation polymerization catalyst. The method may enhance the reactivity of isosorbide, reduce the amount of water byproduct, and raise the glass transition temperature and the color stability of the copolyester thus obtained.

20 Claims, 1 Drawing Sheet

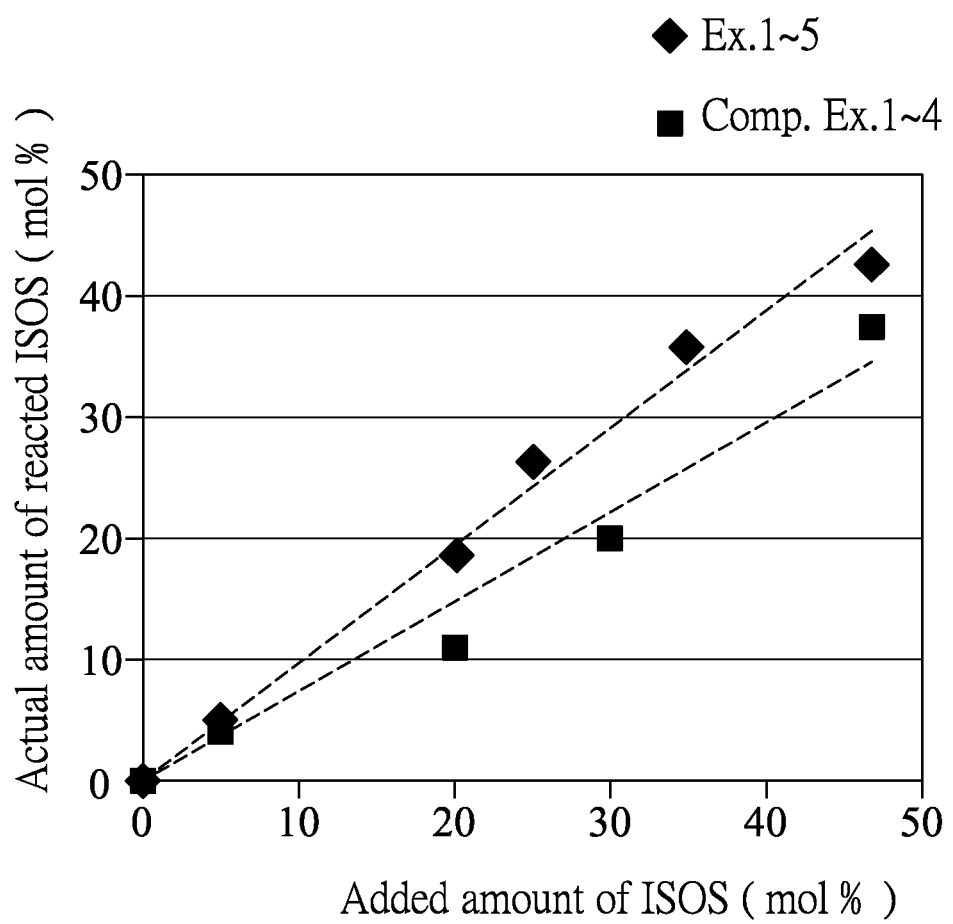

METHOD FOR PREPARING A MODIFIED COPOLYESTER

CROSS-REFERENCE TO RELATED APPLICATION

This application claims priority of Taiwanese Application No. 103146571, filed on Dec. 31, 2014.

FIELD

The disclosure relates to a method for preparing a modified copolymer, and more particularly to a method for preparing a modified copolymer in which isosorbide is copolymerized.

BACKGROUND

Polyethylene terephthalate (referred to as PET hereinafter) has been widely used in packaging materials, molded products, films and the like, and is a kind of plastic material that does not contain endocrine disrupter substances and is environment-friendly. However, PET has unsatisfactory heat resistance and is liable to deform in a high temperature environment. Therefore, the application of PET is limited. In order to enhance the heat resistance of PET, PET is usually copolymerized with copolymerizable comonomers to modify the molecular chain structure thereof so as to enhance such characteristics as glass transition temperature and melting point thereof.

The comonomers conventionally used to modify PET are usually petroleum-based. It would be desirable to utilize a copolymerizable comonomer ultimately derived from biomass. 1,4:3,6-dianhydro-D-sorbitol (referred to as isosorbide hereinafter) is a biodegradable and environment-friendly diol compound, and is readily made from renewable resources, such as sugars and starches. For example, isosorbide can be made from D-glucose by hydrogenation, followed by acid-catalyzed dehydration. When PET is modified by copolymerization with isosorbide, the processability and the biodegradability may be enhanced. However, isosorbide is a secondary alcohol, which has reactivity inferior to that of a primary alcohol. Furthermore, isosorbide has a thermal degradation temperature of about 250° C., as determined via a thermogravimetric analysis under a nitrogen atmosphere by raising the temperature up to 550° C. at a rate of 20° C./min, showing that the heat resistance achieved using isosorbide is still insufficient. In addition, as a cracking reaction may occur during the copolymerization of PET with isosorbide, which may result in undesirable yellowing of the copolyester thus obtained, the application of copolyester may be undesirably affected.

U.S. Pat. No. 6,656,577 B1 discloses a process for making a low color copolymer of ethylene glycol, isosorbide and terephthalic acid or dimethyl terephthalate by controlling critical process parameters, especially temperature and pressure, at each stage of the process.

US 2011/0251342 A1 discloses a method for preparing a copolymerized polyester resin containing isosorbide. In this method, titanium-based compounds are used as a copolymerization catalyst and phosphorous compounds are used as a stabilizer. The copolymerized polyester resin containing isosorbide prepared according to this method improves clarity.

U.S. Pat. No. 6,063,464 discloses isosorbide-containing polyester and a method for making the same. The process conditions for the method are adjusted so as to alleviate the problem of poor reactivity of isosorbide.

In the aforesaid prior art, since isosorbide is used along with glycols such as ethylene glycol or 1,4-butanediol, a great amount of water may be produced as a by-product. Removal of water from the reaction may result in dissipation of thermal energy. Furthermore, the reactivity of isosorbide is still unsatisfactory. The polyester products thus obtained have disadvantages such as low glass transition temperature and inferior color (yellowing).

It is also known in the art to make an isosorbide-containing polyester in a two-stage process, in which a first esterification product is obtained by subjecting isosorbide to an esterification reaction with a diacid compound or an ester thereof, and a second esterification product is obtained by subjecting ethylene glycol to an esterification reaction with a diacid compound or an ester thereof, followed by a condensation polymerization of the first esterification product and the second esterification product. However, a large amount of water is also produced as a by-product in such a process.

U.S. Pat. No. 6,608,167 B1 discloses bis(2-hydroxyethyl) isosorbide and polymers derived therefrom. Bis(2-hydroxyethyl) isosorbide is produced by contacting isosorbide with a stoichiometric excess of ethylene carbonate in the presence of a catalyst. While the reactivity of isosorbide is enhanced, the polymer derived from bis(2-hydroxyethyl) isosorbide still has the problems of low glass transition temperature, inferior color (yellowing), and a significant amount of water by-product.

There is a need in the art to provide a method for preparing a isosorbide-containing copolyester which may overcome the aforesaid problems of the prior art.

SUMMARY

Therefore, an object of the disclosure is to provide a method for preparing a modified copolyester which may enhance the reactivity of isosorbide, reduce the amount of water by-product, and raise the glass transition temperature and the color stability of the copolyester thus obtained.

According to this disclosure, there is provided a method for preparing a modified copolyester, comprising the steps of:

i) subjecting a mono(2-hydroxylalkyl)dicarboxylate represented by formula (A) to an esterification reaction with an isosorbide to form an intermediate,

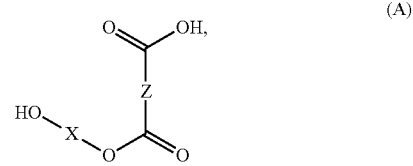

wherein

X represents a divalent $C_2$-$C_{10}$ aliphatic hydrocarbyl group which is unsubstituted or substituted with at least one of a $C_1$-$C_4$ alkyl group and a $C_2$-$C_4$ alkenyl group, and Z represents a divalent hydrocarbyl group;

and ii) subjecting the intermediate to a condensation polymerization in the presence of a condensation polymerization catalyst.

BRIEF DESCRIPTION OF THE DRAWINGS

Other features and advantages of the disclosure will become apparent in the following detailed description of the embodiments with reference to the accompanying drawing, of which:

FIG. 1 is a plot illustrating correlation between the amounts of reacted isosorbide in Examples 1-5 and Comparative Examples 1-4 and the amounts of added isosorbide in Examples 1-5 and Comparative Examples 1-4.

DETAILED DESCRIPTION

A method for preparing a modified copolyester according to this disclosure includes the steps of:

I) Ring-Opening Reaction:

A dicarboxylic acid or an ester thereof and a cyclic carbonate represented by formula (I) are subjected to a ring-opening reaction in the presence of a ring-opening catalyst to form a first intermediate,

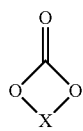
(I)

wherein X represents a divalent $C_2$-$C_{10}$ aliphatic hydrocarbyl group which is unsubstituted or substituted with at least one of a $C_1$-$C_4$ alkyl group and a $C_2$-$C_4$ alkenyl group.

Preferably, the dicarboxylic acid or an ester thereof suitable for the ring-opening reaction includes an aromatic dicarboxylic acid or an ester thereof, an aliphatic dicarboxylic acid or an ester thereof, and combinations thereof.

More preferably, the dicarboxylic acid or an ester thereof suitable for the ring-opening reaction includes an aromatic dicarboxylic acid or an ester thereof, for example, terephthalic acid or dimethyl terephthalate, isophthalic acid or dimethyl isophthalate, naphthalene dicarboxylic acid or dimethyl naphthalene dicarboxylate, or combinations thereof.

Most preferably, the dicarboxylic acid or an ester thereof suitable for the ring-opening reaction includes terephthalic acid or dimethyl terephthalate or a combination thereof.

Preferably, the aliphatic dicarboxylic acid or an ester thereof suitable for the ring-opening reaction includes cyclohexanedicarboxylic acid or dimethyl cyclohexanedicarboxylate, succinic acid or dimethyl succinate, adipic acid or dimethyl adipate, azelaic acid or dimethyl azelate, sebacic acid or dimethyl sebacate, or combinations thereof.

The dicarboxylic acid for the ring-opening reaction in the illustrated examples is terephthalic acid.

Preferably, the cyclic carbonate used for the ring-opening reaction is of formula (I) wherein X represents a divalent $C_2$-$C_5$ aliphatic hydrocarbyl group which is unsubstituted or substituted with at least one of a $C_1$-$C_4$ alkyl group and a $C_2$-$C_4$ alkenyl group.

More preferably, the cyclic carbonate used for the ring-opening reaction is of formula (I) wherein X

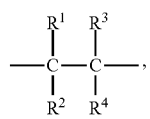

wherein $R^1$, $R^2$, $R^3$, and $R^4$ independently represent hydrogen, a $C_1$-$C_4$ alkyl group, or a $C_2$-$C_4$ alkylene group. In other words, more preferably, the cyclic carbonate used for the ring-opening reaction includes a compound of formula (II):

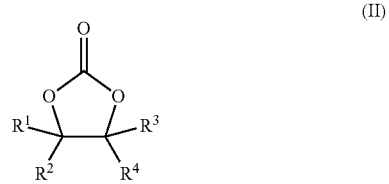
(II)

wherein $R^1$, $R^2$, $R^3$, and $R^4$ are defined as above.

Most preferably, the cyclic carbonate used for the ring-opening reaction is selected from ethylene carbonate, propylene carbonate, 4-ethyl-1,3-dioxolan-2-one, 4-n-propyl-1,3-dioxolan-2-one, and 4-n-butyl-1,3-dioxolan-2-one.

The cyclic carbonate for the ring-opening reaction in the illustrated examples is ethylene carbonate.

During the ring-opening reaction, a molar ratio of the cyclic carbonate to the dicarboxylic acid or the ester thereof is kept in a range from 1.3 to 0.5.

The ring-opening catalyst suitable for this disclosure preferably includes an amine-containing compound, and is more preferably selected from triethylamine, tributylamine, tetramethylammonium hydroxide (TMAH), tetraethylammoniumhydroxide (TEAH), and combinations thereof.

The ring-opening reaction is performed by subjecting a carboxyl group of the dicarboxylic acid or a carboxylate group of an ester of the dicarboxylic acid to a reaction with the alkylene carbonate to form the first intermediate.

The first intermediate formed by the ring-opening reaction includes a mono(2-hydroxylalkyl)dicarboxylate represented by formula (A):

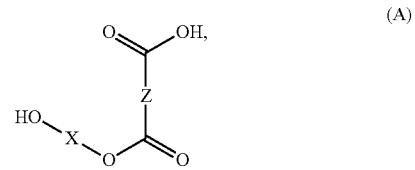
(A)

wherein

X represents a divalent $C_2$-$C_{10}$ aliphatic hydrocarbyl group which is unsubstituted or substituted with at least one of a $C_1$-$C_4$ alkyl group and a $C_2$-$C_4$ alkenyl group; and Z represents a divalent hydrocarbyl group.

Preferably, the mono(2-hydroxylalkyl)dicarboxylate is of formula (A) in which Z represents an arylene group, that is, the mono(2-hydroxylalkyl)dicarboxylate is preferably of formula (A'):

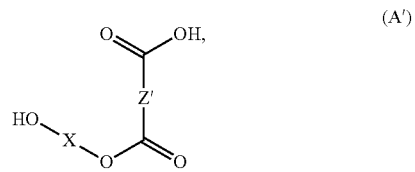
(A')

wherein

X represents a divalent $C_2$-$C_{10}$ aliphatic hydrocarbyl group which is unsubstituted or substituted with at least one of a $C_1$-$C_4$ alkyl group and a $C_2$-$C_4$ alkenyl group; and Z' represents an arylene group and preferably a phenylene group.

More preferably, the mono(2-hydroxylalkyl)dicarboxylate is mono(2-hydroxylethyl)terephthalate.

II) Esterification Reaction:

The first intermediate is subjected to an esterification reaction with an isosorbide to form a second intermediate. Specifically, the esterification reaction is performed by subjecting a carboxyl group of the dicarboxylic acid or a carboxylate group of an ester of the dicarboxylic acid to a reaction with the isosorbide to form the second intermediate. The second intermediate includes a compound represented by formula (III),

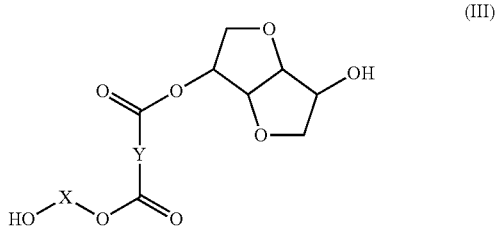

(III)

wherein

Y represents an arylene group or a divalent aliphatic hydrocarbyl group; and

X represents a divalent $C_2$-$C_{10}$ aliphatic hydrocarbyl group which is unsubstituted or substituted with at least one of a $C_1$-$C_4$ alkyl group and a $C_2$-$C_4$ alkenyl group.

Preferably, X in formula (III) represents an ethylene group which is unsubstituted or substituted with at least one of a $C_1$-$C_4$ alkyl group and a $C_2$-$C_4$ alkenyl group. More preferably, X in formula (III) represents an unsubstituted ethylene group.

Preferably, Y in formula (III) represents a phenylene group, a naphthylene group, or a divalent $C_4$-$C_{10}$ aliphatic hydrocarbyl group. More preferably, Y in formula (III) represents a phenylene group.

Preferably, the second intermediate includes a compound represented by formula (IV):

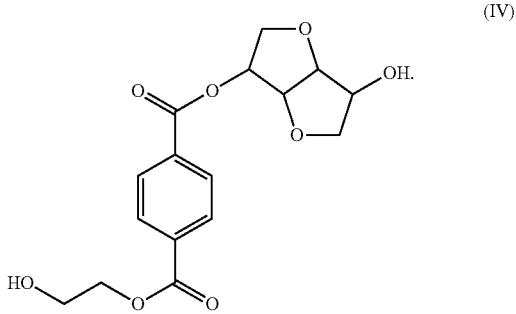 [SMILES: O=C(OCCO)c1ccc(C(=O)OC2COC3C(O)COC23)cc1]

(IV)

Preferably, each of the ring-opening reaction and the esterification reaction is performed at a temperature ranging from 150° C. to 250° C. More preferably, the ring-opening reaction is performed at 150° C. and the esterification reaction is performed at 220° C.

Preferably, the esterification reaction is performed at ambient pressure. More preferably, the esterification reaction is performed at 1 atm.

Compared to the esterification reactions using isosorbide and glycol in the conventional methods for preparing a modified polyester, the esterification reaction in the method of this disclosure may be performed at a relatively low temperature and a relatively low pressure. Moreover, the by-products produced in the method of this disclosure are carbon dioxide and only a small amount of water, and the carbon dioxide may be recycled for preparing the cyclic carbonate. Thus, the problems encountered in the esterification reactions in the conventional methods for preparing a modified polyester due to a large amount of water by-product may be alleviated. In addition, the overall reaction efficiency may be enhanced, and the copolyester thus produced may have superior color and other physical properties.

Preferably, the isosorbide is added in an amount ranging from 1 mol % to 50 mol % based on a total molar amount of the cyclic carbonate and the isosorbide. More preferably, the isosorbide is added in an amount ranging from 4 mol % to 25 mol % based on a total molar amount of the cyclic carbonate and the isosorbide. It is noted that when the isosorbide is added in an amount less than 1 mol %, the glass transition temperature of the modified copolymer thus obtained may not be effectively enhanced, and when the isosorbide is added in an amount more than 50 mol %, the subsequent polymerization may not be performed easily.

A molar ratio of a total of the cyclic carbonate and the isosorbide to the dicarboxylic acid or the ester thereof ranges preferably from 1:1 to 2:1 and more preferably from 1.2:1 to 1.3:1.

III) Condensation Polymerization:

The second intermediate is subjected to a condensation polymerization in the presence of a condensation polymerization catalyst.

Preferably, the condensation polymerization catalyst is selected from an antimony-containing compound, a germanium-containing compound, a tin-containing compound, a titanium-containing compound, a gallium-containing compound, an aluminum-containing compound, and combinations thereof.

A non-limiting example of the antimony-containing compound is antimony trioxide ($Sb_2O_3$).

A non-limiting example of the germanium-containing compound is germanium dioxide ($GeO_2$).

Examples of the tin-containing compound include, but are not limited to, tin dioxide ($SnO_2$), monobutyltin oxide, dibutyltin oxide, and combinations thereof.

Examples of the titanium-containing compound include, but are not limited to, titanium isopropoxide, tetrabutyl titanate, dihydroxybis(ammonium lactato)titanium, $TiO_2$—$SiO_2$, sodium titanate, $TiO_2$-hydrotalcite, and combinations thereof.

A non-limiting example of the gallium-containing compound is gallium trioxide ($Ga_2O_3$).

Examples of the aluminum-containing compound include, but are not limited to, aluminum isopropoxide, aluminum tristearate, and a combination thereof.

The condensation polymerization catalyst used in the illustrated examples is antimony trioxide or germanium dioxide.

The condensation polymerization is performed under a pressure preferably from 0 to 3 torr and more preferably less than 1 torr.

Preferably, the condensation polymerization is performed at a temperature ranging from 200 to 300° C. More preferably, the condensation polymerization is performed at a temperature ranging from 250 to 280° C. It is noted that when the condensation polymerization is performed at a temperature above 300° C., the molecular weight of the copolyester thus obtained may be unsatisfactory due to severe chain scission degradation, and when the condensation polymerization is performed at a temperature less than 200° C., the condensation polymerization may not be performed easily.

Preferably, in order to maintain reaction stability of the process of this disclosure, a processing aid such as an antioxidant, a heat stabilizer, and the like may be added during at least one of the ring-opening reaction, the esterification reaction, and the condensation polymerization.

The modified copolyester obtained by the method of this disclosure has an intrinsic viscosity preferably larger than 0.4 dL/g and more preferably larger than 0.5 dL/g.

The following examples are provided to illustrate the embodiments of the disclosure, and should not be construed as limiting the scope of the disclosure.

Examples 1-5

Preparation of Modified Copolyesters Using Ethylene Carbonate and Isosorbide

The modified copolyesters were produced according to the following steps, the materials used and the amounts thereof being shown in Table 1.

Step 1: Purified terephthalic acid (TPA) and ethylene carbonate (EC) were homogeneously mixed at 50° C. to obtain a mixture.

Step 2: Tetraethylammonium hydroxide (TEAH, a ring-opening catalyst) was added to the mixture, following by a ring-opening reaction at 150° C. to form a reaction mixture containing mono(2-hydroxylethyl)terephthalate.

Step 3: Isosorbide (ISOS) was added to the reaction mixture, followed by an esterification reaction at 220° C. under an ambient pressure until a conversion rate of 95% was reached to form an intermediate containing a compound represented by formula (IV):

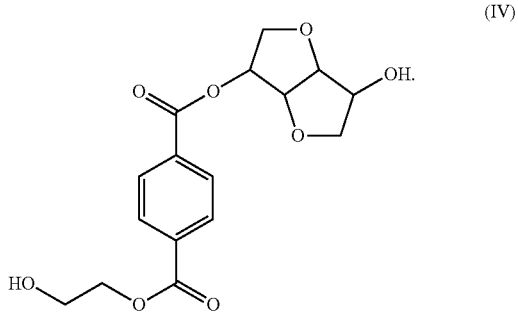 [SMILES: O=C(OCCO)c1ccc(C(=O)OC2COC3C(O)COC23)cc1]

Step 4: Antimony trioxide ($Sb_2O_3$, a condensation polymerization catalyst) was added to the intermediate, followed by a condensation polymerization at 275° C. under a pressure of 1 torr to obtain the modified copolyester.

Comparative Examples 1-4

Preparation of Modified Copolyester Using Ethylene Glycol and Isosorbide

The modified copolyesters were produced according to the following steps, the materials used and the amounts thereof being shown in Table 1.

Step 1: Purified terephthalic acid (TPA), ethylene glycol and isosorbide (ISOS) were homogeneously mixed at 50° C. to obtain a mixture.

Step 2: The mixture was subjected to an esterification reaction at 250° C. under a pressure of 2-3 kg/cm² until a conversion rate of 95% was reached, to form an intermediate.

Step 3: Antimony trioxide ($Sb_2O_3$, a condensation polymerization catalyst) was added to the intermediate, followed by a condensation polymerization at 275° C. under a pressure of 1 torr to obtain the modified copolyester.

Synthesis Example 1

Preparation of bis(2-hydroxyethyl)isosorbide (BHEIS) according to Example 1 of U.S. Pat. No. 6,608,167 B1

Isosorbide (146.1 g), ethylene carbonate (184.93 g) and potassium carbonate (1.66 g) were mixed to obtain a mixture, followed by purging with nitrogen and then slowing heating to 150° C. The reaction was continued until carbon dioxide evolution ceases, followed by cooling to room temperature and vacuum distilling to remove unreacted reactants to obtain the bis(2-hydroxyethyl)isosorbide product.

Comparative Examples 5 and 6

The steps in Comparative Examples 1-4 were repeated except that isosorbide (ISOS) used in step 1 was replaced by bis(2-hydroxyethyl)isosorbide (BHEIS) obtained in Synthesis Example 1.

TABLE 1

| | Weights (g) | | | | | | | | | | |
| | Examples | | | | | Comparative Examples | | | | | |
| Components (Mw*, g/mol) | 1 | 2 | 3 | 4 | 5 | 1 | 2 | 3 | 4 | 5 | 6 |
| --- | --- | --- | --- | --- | --- | --- | --- | --- | --- | --- | --- |
| TPA (166.13) | 338.4 | 318.0 | 311.7 | 299.9 | 286.8 | 338.4 | 318.0 | 305.7 | 286.8 | 338.4 | 311.7 |
| EC (88.06) | 213.0 | 168.5 | 154.9 | 129.2 | 100.0 | — | — | — | — | — | — |

TABLE 1-continued

| | | Weights (g) | | | | | | | | | | |
|---|---|---|---|---|---|---|---|---|---|---|---|---|
| | | Examples | | | | | Comparative Examples | | | | | |
| Components (Mw*, g/mol) | | 1 | 2 | 3 | 4 | 5 | 1 | 2 | 3 | 4 | 5 | 6 |
| EG (62.07) | | — | — | — | — | — | 150.1 | 118.8 | 99.9 | 71.0 | 150.1 | 109.2 |
| ISOS (146.14) | | 18.6 | 69.9 | 85.6 | 115.4 | 148.0 | 18.6 | 69.9 | 100.8 | 148.0 | — | — |
| BHEIS (234.14) | | — | — | — | — | — | — | — | — | — | 29.8 | 137.2 |
| Ring-opening catalyst | TEAH (147.256) | 0.8 | 0.8 | 0.4 | 0.6 | 0.2 | — | — | — | — | — | — |
| Condensation polymerization catalyst | $Sb_2O_3$ (291.52) | 0.12 | 0.08 | 0.08 | 0.08 | 0.12 | 0.12 | 0.12 | 0.12 | 0.12 | 0.12 | 0.12 |
| | $GeO_2$ (104.64) | — | 0.04 | 0.04 | 0.04 | — | — | — | — | — | — | — |

*Mw: weight average molecular weight

Calculation of Reacted Isosorbide:

The modified copolyesters obtained in Examples 1-5 and Comparative Examples 1-6 were each dissolved in 30% trifluoroacetic acid, followed by diluting with deuterochloroform ($CDCl_3$). 1H nuclear magnetic resonance (1H NMR) was determined using a nuclear magnetic resonance (Avance NMB, manufactured by Bruker). The actual amounts of reacted isosorbide in Examples 1-5 and Comparative Examples 1-4 and the actual amounts of reacted bis(2-hydroxyethyl)isosorbide in Comparative Examples 5 and 6 were calculated. The results are shown in Table 2.

The actual amounts of reacted isosorbide (mol %) and the added amounts of isosorbide (mol %) in Examples 1-5 and Comparative Examples 1-4 as shown in Table 2 were plotted. The results are shown in FIG. 1.

As shown in FIG. 1, the actual amounts of reacted isosorbide in Examples 1-5 are significantly higher than those of reacted isosorbide in Comparative Examples 1-4. This demonstrates that the reactivity of isosorbide in Examples 1-5, in which ethylene carbonate was used, is superior to the reactivity of isosorbide in Comparative Examples 1-4, in which ethylene glycol was used.

TABLE 2

| | Examples | | | | | Comparative Examples | | | | | |
|---|---|---|---|---|---|---|---|---|---|---|---|
| Components | 1 | 2 | 3 | 4 | 5 | 1 | 2 | 3 | 4 | 5 | 6 |
| Added amounts of ISOS (mol %) | 5 | 20 | 25 | 35 | 47 | 5 | 20 | 30 | 47 | | |
| Added amounts of BHEIS (mol %) | | | | | | | | | | 5 | 25 |
| Actual amounts of reacted ISOS (mol %) | 5.3 | 18.6 | 26.3 | 35.7 | 42.5 | 3.9 | 11.3 | 20.1 | 37.4 | | |
| Actual amounts of reacted BHEIS (mol %) | | | | | | | | | | 8.0 | 18.9 |

It should be noted that the added amounts in mole % shown in Table 2 were calculated from the weights shown in Table 1 and that the actual amounts of the reacted components shown in Table 2 were calculated from the actual amounts of the components reacted in the reactions. The added amounts of isosorbide (mol %) and the actual amounts of reacted isosorbide (mol %) in Examples 1-5 are based on 100 mol % of a total of ethylene carbonate and isosorbide. The added amounts of isosorbide (mol %) and the actual amounts of reacted isosorbide (mol %) in Comparative Examples 1-4 are based on 100 mol % of a total of ethylene glycol and isosorbide. The added amounts of isosorbide (mol %) and the actual amounts of reacted ISOS (mol %) in Comparative Examples 5 and 6 are based on 100 mol % of a total of ethylene glycol and bis(2-hydroxyethyl) isosorbide.

Measurement of Glass Transition Temperature (Tg) and Melting Point (TM) of Modified Copolyester:

The glass transition temperature (Tg) and the melting point (Tm) of each of the modified copolyesters obtained in Examples 1-5 and Comparative Examples 1-6 were measured using a differential scanning calorimeter (DSC 2910) manufactured by TA Instrument. The results are shown in Table 3. The measurement was conducted according to the operation manual of the differential scanning calorimeter, and involved the following steps: (1) the modified copolyester was heated from 30° C. at a rate of 10° C./min to 300° C.; (2) the modified copolyester was then cooled from 300° C. at a rate of 10° C./min to 30° C.; and (3) the modified copolyester was heated again from 30° C. at a rate of 10° C./min to 300° C., and the glass transition temperature and the melting pointed were determined.

TABLE 3

| Components | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Added amounts of ISOS(mol %) | 5 | 20 | 25 | 35 | 47 | 5 | 20 | 30 | 47 | | |
| Added amounts of BHEIS (mol %) | | | | | | | | | | 5 | 25 |
| Tg (° C.) | 86.9 | 93.1 | 109.1 | 120.9 | 127.6 | 84.5 | 90.8 | 103.1 | 121.6 | 80.6 | 71.1 |
| Tm (° C.) | 241.5 | N.A. | N.A. | N.A. | N.A. | 241.3 | N.A. | N.A. | N.A. | 239.5 | N.A. |

N.A.: the obtained copolymer is amorphous, and the melting point and crystallization temperature thereof are not available.

The glass transition temperature of the conventional modified copolyester obtained without using ethylene carbonate is usually about 80° C. As shown in the results for Examples 1-5 in Table 3, the glass transition temperature is raised from 86.9° C. to 127.6° C. when the added amount of isosorbide is increased from 5 moo to 47 mol %. A comparison of the results for Examples 1, 2 and 5 with those of Comparative Examples 1, 2 and 4 shows that the glass transition temperatures of the modified copolyesters obtained in Examples 1, 2 and 4 in which ethylene carbonate was used are respectively higher than the glass transition temperatures of the modified copolyesters obtained in Comparative Examples 1, 2 and 4 in which ethylene glycol was used. This demonstrates that the glass transition temperature of the modified copolyester obtained by the method of this disclosure is significantly raised as compared to the glass transition temperature of the modified copolyester obtained using ethylene glycol.

Furthermore, as shown by the results of Comparative Examples 5 and 6 in which bis(2-hydroxyethyl)isosorbide and ethylene glycol were used, the glass transition temperature of the modified copolyester is reduced as the added amount of bis(2-hydroxyethyl)isosorbide is increased. This may be due to the fact that bis(2-hydroxyethyl)isosorbide, which is a primary alcohol, has a reactivity higher than that of isosorbide, which is a secondary alcohol, and reacts with ethylene glycol more easily to form an ether group (R—O—R').

Measurement of Hue of Modified Copolyester:

The b value of the hue of each of the modified copolyesters obtained in Examples 1-2 and Comparative Examples 1-2 and 5-6 was measured using a color meter (NE4000) manufactured by Nippon Denshoku. The results (the larger the b value, the more the yellowing) are shown in Table 4.

TABLE 4

| | Added amount of ISOS (mol %) | Added amount of BHEIS (mol %) | bvalue |
|---|---|---|---|
| Ex. 1 | 5 | — | 2.26 |
| Ex. 2 | 20 | — | −0.41 |
| Comp. Ex. 1 | 5 | — | 14.12 |
| Comp. Ex. 2 | 20 | — | 9.65 |

TABLE 4-continued

| | Added amount of ISOS (mol %) | Added amount of BHEIS (mol %) | bvalue |
|---|---|---|---|
| Comp. Ex. 5 | — | 5 | 12.72 |
| Comp. Ex. 6 | — | 25 | 18.22 |

As shown in Table 4, for Example 1 and Comparative Example 1, in which the added amounts of isosorbide were the same, the b value (2.26) of the modified copolyester obtained in Example 1 in which ethylene carbonate was used is significantly lower than the b value (14.12) of the modified copolyester obtained in Comparative Example 1 in which ethylene glycol was used. For Example 2 and Comparative Example 2 in which the added amounts of isosorbide were the same, the b value (−0.41) of the modified copolyester obtained in Example 2 in which ethylene carbonate was used is significantly lower than the b value (9.65) of the modified copolyester obtained in Comparative Example 2 in which ethylene glycol was used. This demonstrates that the yellowing problem associated with the copolyester of the prior art may be alleviated by the method of this disclosure in which cyclic carbonate is used. In the method of this disclosure, the dicarboxylic acid or an ester thereof is subjected to the ring-opening reaction with the cyclic carbonate to form the first intermediate, which may be subjected to the esterification reaction with isosorbide at a relatively low temperature, so that the cracking reaction may be inhibited to reduce yellowing of the copolyester. In addition, the b values (2.26 and −0.41) of the modified copolyesters obtained in Examples 1 and 2 are also significantly lower than the b values (12.72 and 18.22) of the modified copolyesters obtained in Comparative Examples 5 and 6 in which bis(2-hydroxyethyl)isosorbide (BHEIS) was used.

Measurement of Intrinsic Viscosity of Modified Copolyester:

Each of the modified copolyesters obtained in Examples 1-5 and Comparative Examples 1-6 was added with a mixture of phenol and tetrachloroethane in a weight ratio of 3:2 to prepare a test solution of 0.4 wt/vol %. The intrinsic viscosity of the test solution was measured using an Ubbelohde viscometer at a temperature of 30±0.2° C. The results are shown in Table 5.

TABLE 5

| Components | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Added amount of ISOS (mol %) | 5 | 20 | 25 | 35 | 47 | 5 | 20 | 30 | 47 | | |

TABLE 5-continued

| | Examples | | | | | Comparative Examples | | | | | |
|---|---|---|---|---|---|---|---|---|---|---|---|
| Components | 1 | 2 | 3 | 4 | 5 | 1 | 2 | 3 | 4 | 5 | 6 |
| Added amount of BHEIS (mol %) | | | | | | | | | | 5 | 25 |
| IV (dL/g) | 0.600 | 0.530 | 0.540 | 0.572 | 0.474 | 0.635 | 0.573 | 0.548 | 0.481 | 0.642 | 0.693 |

As shown in Table 5, the intrinsic viscosities of the modified copolyesters obtained in Examples 1-5 are all greater than 0.4 dL/g. The intrinsic viscosities of the modified copolyesters obtained in Examples 1-4 are even greater than 0.5 dL/g.

Weight Analysis of by-Product (Water):

The water produced in Examples 1-5 and Comparative Examples 1-4 was measured. The results are shown in Table 6.

TABLE 6

| Com- | Examples | | | | | Comparative Examples | | | |
|---|---|---|---|---|---|---|---|---|---|
| ponents | 1 | 2 | 3 | 4 | 5 | 1 | 2 | 3 | 4 |
| Added amount of ISOS (mol %) | 5 | 20 | 25 | 35 | 47 | 5 | 20 | 30 | 47 |
| Weight of water (g) | 20.7 | 20.9 | 25.7 | 28.0 | 29.5 | 68.2 | 57.7 | 55.5 | 50.18 |

As shown in Table 6, the amounts of water produced in Examples 1-5 are significantly lower than the amounts of water produced in Comparative Examples 1-4.

In the method of this disclosure, as the dicarboxylic acid or an ester thereof is subjected to the ring-opening reaction with the cyclic carbonate to form the first intermediate, which is then subjected to the esterification reaction with isosorbide, the reactivity of isosorbide can be enhanced, the water by-product can be reduced, and the glass transition temperature as well as the color stability of the modified copolyester can be improved.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for preparing a copolyester, comprising the steps of:
   i) subjecting a mono(2-hydroxylalkyl)dicarboxylate represented by formula (A) to an esterification reaction with an isosorbide to form an intermediate,

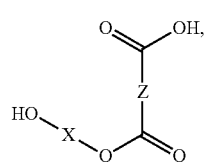

(A)

wherein
   X represents a divalent $C_2$-$C_{10}$ aliphatic hydrocarbyl group which is unsubstituted or substituted with at least one of a $C_1$-$C_4$ alkyl group and a $C_2$-$C_4$ alkenyl group, and
   Z represents a divalent hydrocarbyl group;
   and
   ii) subjecting the intermediate to a condensation polymerization in the presence of a condensation polymerization catalyst.

2. The method according to claim 1, wherein the mono (2-hydroxylalkyl)dicarboxylate is produced by subjecting a dicarboxylic acid or an ester thereof and a cyclic carbonate represented by formula (I) to a ring-opening reaction in the presence of a ring-opening catalyst,

(I)

wherein X represents a divalent $C_2$-$C_{10}$ aliphatic hydrocarbyl group which is unsubstituted or substituted with at least one of a $C_1$-$C_4$ alkyl group and a $C_2$-$C_4$ alkenyl group.

3. The method according to claim 2, wherein the isosorbide is added in an amount ranging from 1 mol % to 50 mol % based on a total molar amount of the cyclic carbonate and the isosorbide.

4. The method according to claim 3, wherein the isosorbide is added in an amount ranging from 4 mol % to 25 mol % based on a total molar amount of the cyclic carbonate and the isosorbide.

5. The method according to claim 2, wherein X represents:

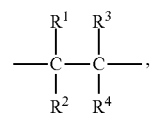

wherein $R^1$, $R^2$, $R^3$, and $R^4$ independently represent hydrogen, a $C_1$-$C_4$ alkyl group, or a $C_2$-$C_4$ alkylene group.

6. The method according to claim 5, wherein $R^1$, $R^2$, $R^3$, and $R^4$ represent hydrogen.

7. The method according to claim 2, wherein the dicarboxylic acid is an aromatic dicarboxylic acid.

8. The method according to claim 7, wherein the aromatic dicarboxylic acid is terephthalic acid.

9. The method according to claim 2, wherein a molar ratio of the cyclic carbonate to the dicarboxylic acid or the ester thereof is kept in a range from 1.3 to 0.5 in the ring-opening reaction.

10. The method according to claim 2, wherein a molar ratio of a total of the cyclic carbonate and the isosorbide to the dicarboxylic acid or the ester thereof ranges from 1:1 to 2:1.

11. The method according to claim 2, wherein each of the ring-opening reaction and the esterification reaction is performed at a temperature ranging from 150° C. to 250° C.

12. The method according to claim 2, wherein the ring-opening catalyst is selected from the group consisting of triethyl amine, tributyl amine, tetramethylammonium hydroxide, tetraethylammonium hydroxide, and combinations thereof.

13. The method according to claim 1, wherein Z represents an arylene group.

14. The method according to claim 13, wherein Z represents a phenylene group.

15. The method according to claim 14, wherein the mono(2-hydroxylalkyl)dicarboxylate is mono(2-hydroxylethyl)terephthalate.

16. The method according to claim 1, wherein the intermediate is represented by formula (III),

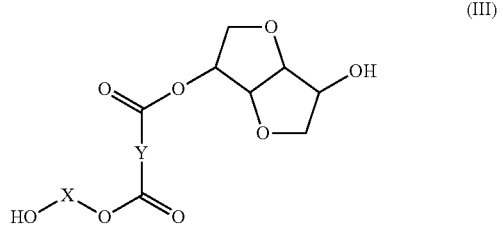

(III)

wherein

Y represents an arylene group or a divalent aliphatic hydrocarbyl group; and

X represents a divalent $C_2$-$C_{10}$ aliphatic hydrocarbyl group which is unsubstituted or substituted with at least one of a $C_1$-$C_4$ alkyl group and a $C_2$-$C_4$ alkenyl group.

17. The method according to claim 16, wherein X represents an ethylene group which is unsubstituted or substituted with at least one of a $C_1$-$C_4$ alkyl group and a $C_2$-$C_4$ alkenyl group.

18. The method according to claim 17, wherein X represents an unsubstituted ethylene group.

19. The method according to claim 1, wherein the condensation polymerization is performed at a temperature ranging from 200° C. to 300° C.

20. The method according to claim 1, wherein the esterification reaction is performed at ambient pressure.

* * * * *